US010198322B2

(12) United States Patent
Manjunath et al.

(10) Patent No.: US 10,198,322 B2
(45) Date of Patent: Feb. 5, 2019

(54) METHOD AND SYSTEM FOR EFFICIENT SELECTIVE BACKUP STRATEGY IN AN ENTERPRISE

(71) Applicant: Tata Consultancy Services Limited, Mumbai (IN)

(72) Inventors: Sumesh Manjunath, Pune (IN); Manish Shukla, Pune (IN); Sachin Premsukh Lodha, Pune (IN); Rohit Saxena, Pune (IN); Sutapa Mondal, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 399 days.

(21) Appl. No.: 15/068,297

(22) Filed: Mar. 11, 2016

(65) Prior Publication Data

US 2016/0274976 A1 Sep. 22, 2016

(30) Foreign Application Priority Data

Mar. 19, 2015 (IN) .......................... 915/MUM/2015

(51) Int. Cl.
*G06F 11/14* (2006.01)
*G06Q 10/00* (2012.01)

(52) U.S. Cl.
CPC ...... *G06F 11/1451* (2013.01); *G06F 11/1464* (2013.01); *G06Q 10/00* (2013.01); *G06F 2201/80* (2013.01); *G06F 2201/805* (2013.01)

(58) Field of Classification Search
CPC .................................................. G06F 11/1451
See application file for complete search history.

(56) References Cited

U.S. PATENT DOCUMENTS

| 6,453,325 B1 * | 9/2002 | Cabrera ............... G06F 11/1461 |
| 7,493,314 B2 | 2/2009 | Huang et al. |
| 2007/0255758 A1 | 11/2007 | Zheng et al. |
| 2009/0210412 A1 | 8/2009 | Oliver et al. |

OTHER PUBLICATIONS

Orgnet, "Title: Data Mining Email to Discover Organizational Networks and Emergent Communities in Work Flows", http://www.orgnet.com/email.html (2008).

* cited by examiner

*Primary Examiner* — Van H Oberly
(74) *Attorney, Agent, or Firm* — Finnegan, Henderson, Farabow, Garrett & Dunner LLP (57) ABSTRACT

The present disclosure provides systems and methods to optimize data backup in a distributed enterprise system by firstly generating a set of unique files from all the files available in the enterprise. A backup set comprising files to be backed up are then generated from the set of unique files and backup is scheduled in the order in which the files to be backed up are identified. Unique files are generated based on file sharing patterns and communications among users that enable generating a social network graph from which one or more communities can be detected and deduplication can be performed on the files hosted by client systems in these communities thereby conserving resources.

18 Claims, 9 Drawing Sheets

METHOD AND SYSTEM FOR EFFICIENT SELECTIVE BACKUP STRATEGY IN AN ENTERPRISE

PRIORITY CLAIM

The present application claims priority from Indian Provisional Patent Application No. 915/MUM/2015, filed on Mar. 19, 2015, the entirety of which is hereby incorporated by reference.

TECHNICAL FIELD

The present disclosure in general elates to a field of data management in a distributed enterprise system.

BACKGROUND

Data in a distributed enterprise system may be confidential and hold significant value. Preventing data leakage outside the network of the enterprise is generally provided by Data Leakage Prevention (DLP) techniques. Conventionally, Enterprise Content Managing (ECM) systems works as a central repository and once files are copied, it cannot be tracked in the enterprise network until that file is uploaded back into the ECM to enable correlation. Backup techniques are generally applied on the central repository. Thus, files need to be transferred to a central server before processing which consumes enormous bandwidth. In case a file already exists on the central server, backup process may consume more time for deduplication of data in real time. Monitoring file movement in the enterprise is a challenge not in view of confidentiality but also from the perspective of resource consumption when backup of data is performed in a distributed enterprise system.

SUMMARY

Embodiments of the present disclosure present technological improvements as solutions to one or more of the above-mentioned technical problems recognized by the inventors in conventional systems.

In an aspect there is provided a method comprising: generating a set of unique files corresponding to a set of client systems in a distributed enterprise system hosting the unique files, wherein the set of unique files is an ordered set based on an ordered function; generating a backup set comprising files to be backed up by iteratively performing: identifying, at least one client system from the set of client systems, having maximum number of files outputted by the ordered function to generate an identified client system for backup; adding the identified client system and the unique files thereof to the backup set; and re-defining the set of unique files and the set of client systems by eliminating the identified client system and the unique files thereof until all the unique files are moved to the backup set; and scheduling a selective backup based on an order in which the files to be backed up are added to the backup set.

In another aspect, there is provided a system comprising one or more processors; one or more data storage devices operatively coupled to the one or more processors and configured to store instructions configured for execution by the one or more processors to: generate a set of unique files corresponding to a set of client systems in a distributed enterprise system hosting the unique files, wherein the set of unique files is an ordered set based on an ordered function; generate a backup set comprising files to be backed up by iteratively performing: identifying, at least one client system from the set of client systems, having maximum number of files outputted by the ordered function to generate an identified client system for backup; adding the identified client system and the unique files thereof to the backup set; and re-defining the set of unique files and the set of client systems by eliminating the identified client system and the unique files thereof until all the unique files are moved to the backup set; and schedule a selective backup based on an order in which the files to be backed up are added to the backup set.

In yet another aspect, there is provided a computer program product for processing data, comprising a non-transitory computer readable medium having program instructions embodied therein for generating a set of unique files corresponding to a set of client systems in a distributed enterprise system hosting the unique files, wherein the set of unique files is an ordered set based on an ordered function; generating a backup set comprising files to be backed up by iteratively performing: identifying, at least one client system from the set of client systems, having maximum number of files outputted by the ordered function to generate an identified client system for backup; adding the identified client system and the unique files thereof to the backup set; and re-defining the set of unique files and the set of client systems by eliminating the identified client system and the unique files thereof until all the unique files are moved to the backup set; and scheduling a selective backup based on an order in which the files to be backed up are added to the backup set.

In an embodiment of the present disclosure, the ordered function is based on a reference count.

In an embodiment of the present disclosure, generating the set of unique files comprises: identifying file sharing patterns among users in the distributed enterprise system; analyzing the file sharing patterns and communications among the users for generating a social network graph; performing community detection on the social network graph to generate one or more communities; and performing deduplication on the files hosted by the at least one client system comprised in the one or more communities.

In an embodiment of the present disclosure, identifying file sharing patterns comprises: receiving inputs comprising location, metadata and at least one unique identifier for files associated with one or more file events from the client systems; analyzing the inputs and characterizing the files having matching content therein based on a level of granularity of duplication therein; and identifying senders and receivers associated with each of the files based on the characterization of the files.

In an embodiment of the present disclosure, the at least one unique identifier comprises a hash digest for each of the files, the content and the metadata based on a hash technique.

In an embodiment of the present disclosure, identifying senders and receivers comprises: extracting a timestamp associated with each of the files and identifying a file with the oldest time stamp in the one or more lists as a source file associated with a sender and the files other than the source file as the received files associated with one or more receivers.

In an embodiment of the present disclosure, the level of granularity of duplication is one of (i) having an exact match of all of the at least one unique identifier; (ii) having a pre-defined level of match of the content; and (iii) having a match of at least one snippet in the files by fingerprinting of the content.

In an embodiment of the present disclosure, generating a social network graph comprises: generating a social network graph having nodes corresponding to the senders and receivers and edges characterized by weights assigned based on temporal importance measure computed for the communications between the users and the file sharing patterns; and computing a score for each sender-receiver pair based on type of recipient, classification of communication between the senders and receivers and presence of attachments.

In an embodiment of the present disclosure, performing community detection comprises use of a community detection technique configured to receive pre-defined information pertaining to known communities among the users.

In an embodiment of the present disclosure, performing deduplication comprises: a first level deduplication, at the one or more client systems, the first level deduplication being based on the content, the metadata and the at least one unique identifier associated with the files; and a second level deduplication of the files from each of the one or more client systems in the distributed enterprise system, the second level deduplication being based on the metadata and the at least one unique identifier associated with the files.

It is to be understood that both the foregoing general description and the following detailed description are exemplary and explanatory only and are not restrictive of the disclosure, as claimed.

BRIEF DESCRIPTION OF THE DRAWINGS

The following detailed description of preferred embodiments, is better understood when read in conjunction with the appended drawing. For the purpose of illustrating the disclosure, there is shown in the drawing an exemplary construction of the disclosure, however, the disclosure is not limited to the specific methods and system illustrated.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 6, where similar reference characters denote corresponding features consistently throughout the figures, there are shown preferred embodiments and these embodiments are described in the context of the following exemplary system and method.

In the context of the present disclosure, certain expressions are defined herein below for ease of explanation.

The expression "file events" refers to operations including creation, modification, updation, deletion, attribute changes, encryption, archiving, meta-data changes and the like associated with files.

The expression "reference count" refers to a count of number of references to a file in one or more client systems in a distributed enterprise system. For instance, if there are two copies of a file in the distributed enterprise system, the file would be characterized by a reference count 2, if there is a single copy of a file in the distributed enterprise system, the file would be characterized by a reference count 1.

The expression "communication" refers to emails, chats, meeting invites, any other official communication that can be logged in the client/server system.

The expression "unique files" refers to files categorized as unique, post deduplication and having a reference count (as defined herein above) based on the number of copies of the files residing in the distributed enterprise system.

Figure 1:
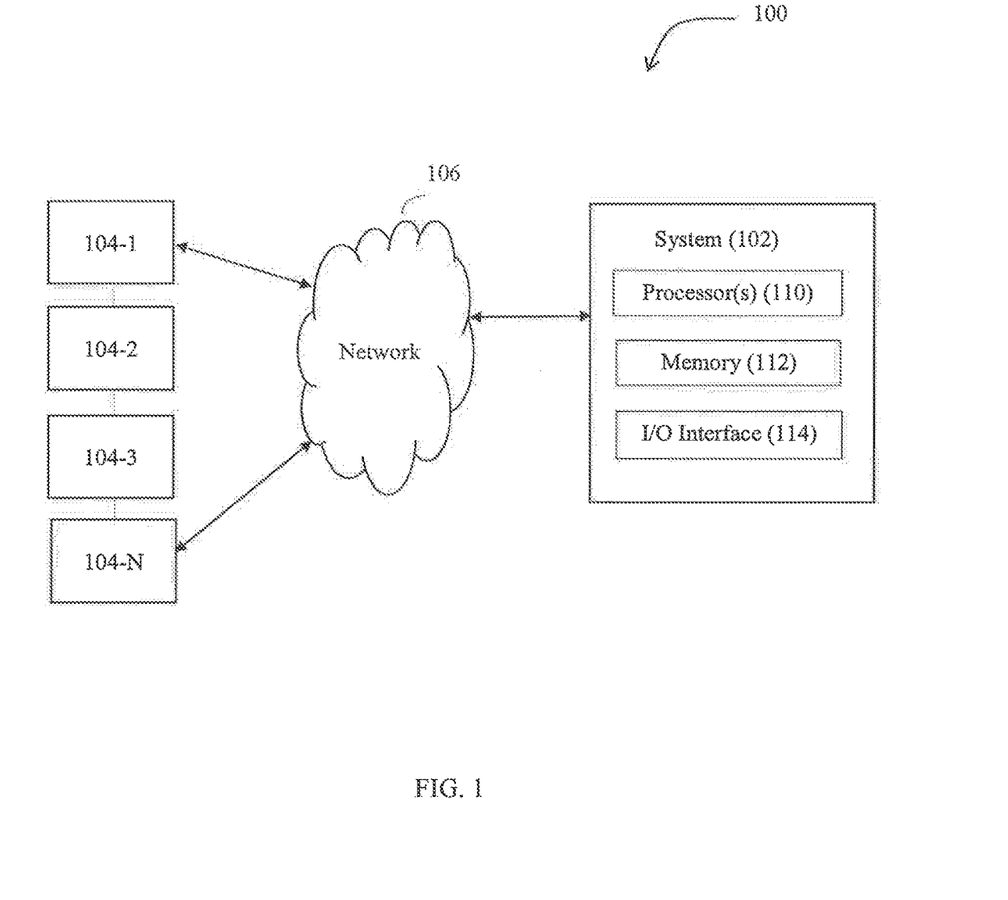
FIG. 1 illustrates a network implementation of a system for optimized data backup in a distributed enterprise system, in accordance with an embodiment of the present disclosure.

FIG. 1 illustrates a network implementation 100 of a system 102 for optimized data backup in a distributed enterprise system, in accordance with an embodiment of the present disclosure. It may be understood that the system 102 may be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2, . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 110, an input/output (I/O) interface 114, and a memory 112. The at least one processor 110 being hardware processors may be implemented as one or more microprocessors, microcomputers, microcontrollers, digital signal processors, central processing units, state machines, logic circuitries, and/or any devices that manipulate signals based on operational instructions. Among other capabilities, the at least one processor 110 is configured to fetch and execute computer-readable instructions stored in the memory 112.

The I/O interface 114 may include a variety of software and hardware interfaces, for example, a web interlace, a graphical user interface, and the like. The I/O interface 114 may allow the system 102 to interact with a user directly or through the client devices 104. Further, the I/O interface 114 may enable the system 102 to communicate with other computing devices, such as web servers and external data servers (not shown). The I/O interface 114 may facilitate multiple communications within a wide variety of networks and protocol types, including wired networks, for example, LAN, cable, etc., and wireless networks, such as WLAN, cellular, or satellite. The I/O interface 114 may include one or more ports for connecting a number of devices to one another or to another server.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules of the system 102 can be stored in the memory 112.

The present disclosure relates to systems and methods for optimized data backup in a distributed enterprise system. In an embodiment, the system may comprise a two-tier architecture operating in a distributed manner. In an embodiment, the two-tier architecture may be loosely coupled i.e. a client system may function independently with limited functionality restricted to the standalone system alone. In an embodiment, monitoring file events and analysis thereof may be distributed among the client systems as well as the server system. Hereinafter, the expression client(s) may refer to a client system operated by a user and the system 102 of the present disclosure may be referred to hereinafter as a "file tracker" or "file tracker system", in accordance with one embodiment.

In one embodiment, the client system may comprise a file tracker client. The file tracker client may start operating as soon as a file is saved in a storage device i.e. memory. The file tracker client may start applying appropriate text extraction and pattern matching based algorithms on the file so as to extract contents of the file and to perform analytics on contents of the file. For instance, the file tracker client may check for sensitive data such as SSN (Social Security No.) and credit card numbers defined by regular expressions. Further, the file tracker client may perform a keyword-based search on contents of the file. The file tracker client may use MD5 hash of the file for performing data deduplication (dedupe). Further, Locality Sensitive Hash (LSH) may help identify files with very similar content and may allow for fuzzy dedupe.

In one embodiment, the file tracker client may monitor file events related to the file such as Create, Read, Update and Delete (CRUD) operations. Further, events related to the file may comprise truncation, attribute change, file encryption, file archive, and change of meta-data related to the file. The events related to the file may be stored in a notification database. The file tracker client may extract features and may store the features in a local database on the client system. The file tracker client may transmit the features periodically to a central server database at specific intervals of time.

Figure 2:
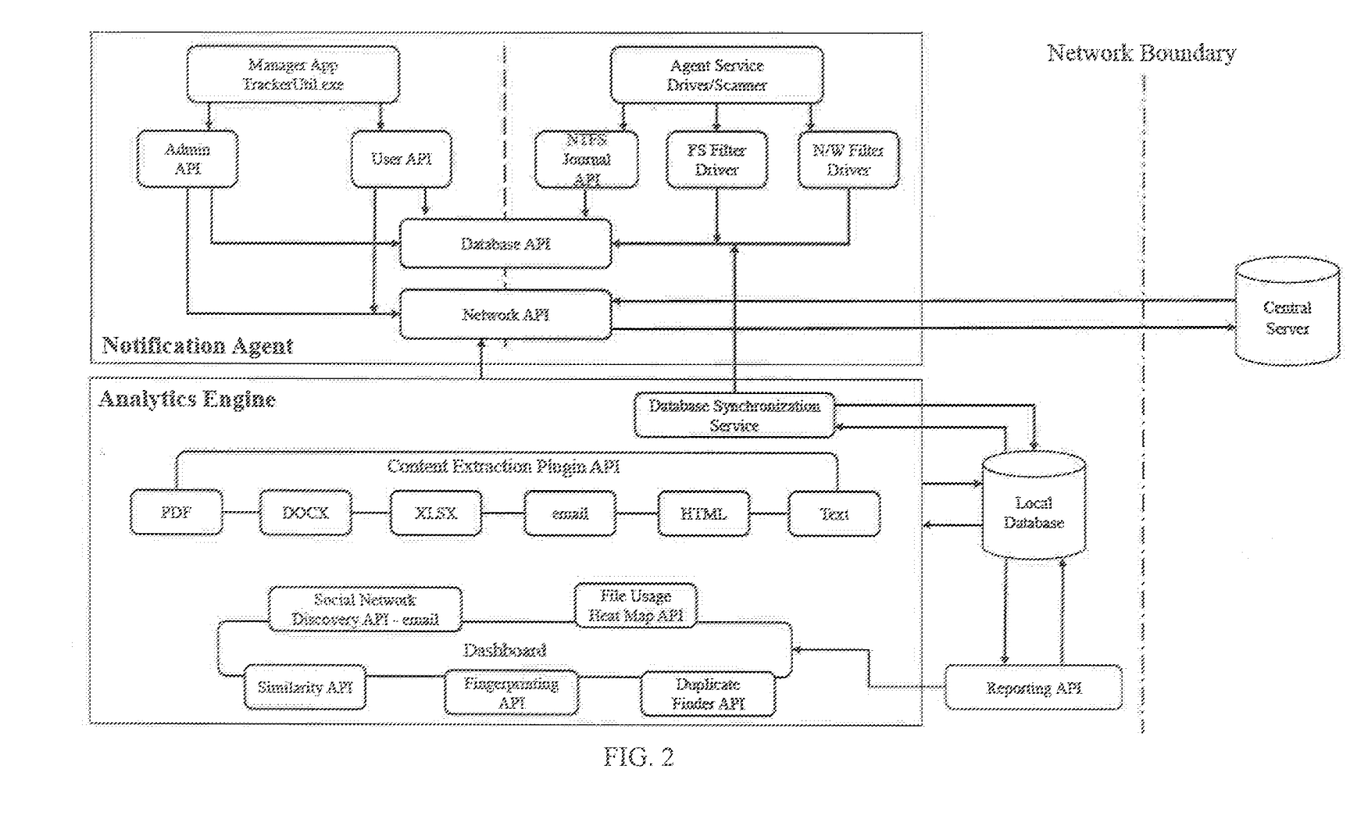
FIG. 2 illustrates a schematic representation of an exemplary data flow in an exemplary architecture of a file tracker client comprised in the system for optimized data backup in a distributed enterprise system, in accordance with an embodiment of the present disclosure.

In one embodiment, the file tracker client may comprise local components present on the client system such as a notification agent and an analytics engine, as illustrated in FIG. 2. The notification agent is configured to monitor local file system notifications. The notification agent may provide an interface to set a monitoring location in the client system, type of files to be monitored and remotely control the notification agent from the server. The notification agent may monitor the file for events related to the file like a new file being created, an old file being deleted or modified. The notification agent may capture a reason for modification of the file and may transmit the events related to the file and reason for modification of the file, to the analytic engine. During a setup phase, the notification agent may take a few seconds to start. Further, the notification agent may have less memory footprints. Once the notification agent is up and running, it takes minimum resources and comes into action only when any file events are triggered. The notification agent need not analyze the content of files in real time as conventionally done in an anti-virus applications. Thus avoiding analysis of the content of files in a real time may involve a lesser usage of processing power and may result in power optimization.

In one embodiment, an agent service driver/scanner of the notification agent may interact with the operating system to monitor the file events generated for the files in the monitoring location. The notification agent may interact with the operating system either in a kernel space or a user space of the Operating System (OS). The notification agent may monitor the file events either by using a New Technology File System (NTFS) journal Application Programming Interface (API) or by using a File System Filter Driver where journaling API is not provided by the underlying file system. An exemplary implementation of the notification agent using the NTFS journal API is based on NTFS change journal functionality of the file system supported by the OS. The notification agent may check for a change in the journal of the file system. Else, the notification agent may start a journaling mechanism and start monitoring the file events. As files, directories, and other NTFS file system objects are added, deleted, and modified, the NTFS file system enters the changes in the journal records in the notification database. Each record in the journal records may indicate a type of change and the object changed. The changes in the journal logs comprise a change to the file and the reason for the change (for example, write operations, truncation, lengthening, and deletion). Read event may not be recorded using the NTFS journal API technique so as to record enough information to allow reversing the change. Thus, using the NTFS journal API technique raises an event post facto.

Alternatively, the system may implement a proactive notification engine by writing a kernel module as a File System Filter Driver.

In one embodiment, the File System Filter driver may monitor all detailed file events including the read events. The File System Filter driver may get notified before, during and after an occurrence of the file event. The File System Filter driver may be in full control of the file events and may stop the event to be executed at any point of time. The notification agent may comprise at least one or more combination of above mentioned techniques to monitor the file events in the monitoring location. The notification agent may use database API to store the file details and corresponding file events as and when the change journal notifies. Since the notification agent monitors only the events and gets the file details, it is a lightweight process with respect to memory usage as well as the performance.

In one embodiment, the notification database may be embedded in the notification agent and may contain information related to the files present in the monitoring location. The notification database may also comprise the file events related to the files including the meta-data of the file events. The notification agent may provide access to the notification database, so that the analytic engine gets the information about the new modification as well as inform the notification agent about the processed state of each file.

In one embodiment, the notification agent may comprise a manager application tracker utility as an interface (can be GUI) to set the monitoring location and the file types to be monitored. In an enterprise setting, certain user access controls cannot be modified by the user like program files and windows folder in windows operating system. Thus, setting the monitoring location restricts the monitoring scope but makes the notification agent more focused and efficient by monitoring only the file events in the selection location. The notification agent may also provide remote access to the server to act as the interface. Network API may connect the notification agent with the analytic engine as well as the client with the server.

In one embodiment, the analytics engine on the client system is configured to perform node specific analytics. The analytics engine may analyze the files based on the file events, notified by the notification agent. The analytics engine may extract text from the modified file. The analytics engine may apply an exact (i.e. crypto hash such as SHA1), a near duplicate (i.e. Locality Sensitive Hashing such as SimHash) and a fuzzy (SD Hash) hash algorithm to identify exact copies and similar documents. The analytics engine may help in comparing partial/snippets of text with a large dataset using a document fingerprinting method. The analytics engine may profile the user based on file access patterns and may create social network based on mail files.

In one embodiment, the analytics engine may check if the file has already been analyzed either in the client system or in the server using deduplication (dedupe) technique. Such a check results in reduced computation, power saving and faster response time. The analytics engine may process each files for determining changes in content of the files and meta-data associated with the files. The analytics engine may correlate the file with other files having similar content in the system. For creating or modifying a new file, the content of the file may be analyzed and deduped within the client system. Along with the deduplication, similar files may be clustered based on a Locality Sensitive Hashing technique or an sdHash technique. The analytics engine may use user details and the time stamp associated with file life cycle. Apart from files, the client system may analyze mail files to identify a network of people with whom the user is communicating in the enterprise. In an embodiment, by using file sharing patterns, the system may create heat maps to give a picture on the files used by the user on a frequent basis and the files present in the file system but rarely used. This may help in creating a platform to convert dark data into a grey data and finally into a white data.

In one embodiment, the analytics engine of the client system may run as a multi-threaded or multi-process task. The analytics engine may be responsible for all analytics of the file tracker. During the setup phase, the analytics engine may need to analyze the entire file content as well as perform comparison within the file system. Analyzing the entire file content as well as performing comparison within the file system consumes a large portion of memory and Central Processing Unit (CPU) processing for performing the analytics. Hence, the analytics engine may run as a multi-threaded/multi-process task and may toggle between a sleep mode and an active mode. The analytics engine may toggle between the modes when the resources are idle or have enough processing power to run without hindering user's tasks. Upon analysis, extracted information is uploaded to the server.

In one embodiment, the analytics engine may get the file information and its location. The analytics engine may run preliminary analysis to check for matching files already present in the local file system. The analytics engine may get information from the central server regarding existence of the file in other client systems. In case the file information is already present in the server, then the analytics engine may get that information from the server and the server maps the new client's location to the file. For a newly created file, the analytics engine may create hash of the complete file, the content and the meta-data of the files. The analytics engine may also find a similarity hash and may try to cluster with similar files. The analytics engine may analyze the content of the file and may create more fingerprints for the contents in the file. The fingerprints can be used to locate an exact position of the search content in a given file, if present. Successively, the file details, the user details along with the hashes and fingerprints are transmitted to the server for a further analysis.

In another embodiment, the analytics engine may analyze email clients used in the standalone system for email communications, and meeting invites attachments. Upon analyzing the email clients, the analytics engine may create a social network between the users interacting using email clients. The social network may indicate connections of a current user in the enterprise. The social network information may be used by the server in consolidating the complete enterprise social network. Further, the analytics engine may create a heat map using files used by the user on a frequent basis. The heat map may be used to determine file sharing patterns of the user.

In yet another embodiment, the analytic engine may include a wide variety of API's to provide a set of functionalities as defined henceforth. A content extraction plugin API may be used to extract content from different file types. For an example, the different file types may include docx, pptx, pdf, archives, pst, nsf and the like. The analytic engine may further include a duplication finder API for identifying an exact copy of files present in the system. A similarity API may cluster similar files together in the system. A fingerprinting API may fingerprint contents in the files, a social network discovery API may generate social graph based on email client files, and a file heat map API may create a dashboard for file sharing patterns.

In one embodiment, the analytic engine may use the content extraction plugin API on the file and meta-data. Since there are large numbers of file types available, the content extraction plugin API may extract the content from the files. File types can be of docx, xlsx, pptx, pdf, archives. The content extraction plugin API may provide input to other API's which may require file content. The content extraction plugin API may contain individual parsers for each file types and may extract the contents and the meta-data from the files. Individual parsers may be used for each file type. In case content from a new file type is required, only parser for that file type may be required and it can be plugged into the content extraction plugin API.

In another embodiment, the duplication finder API may reduce redundant analysis to be performed by the system. The duplication finder API may identify all relevant files comprising exact as well as similar contents. The duplication technique finds the related files in the system and then from entire distributed systems. The duplication technique may use a hashing technique. The duplication technique may define three level of granularity for duplication i.e. exact duplicate files, similar files, and fingerprinting of content. In order to operate on the exact duplicate files, hash functions like MD5, SHA1 may be used. A content extraction component may be used to extract content and its meta-data information. Hashing may be applied on the complete file, file content and meta-data of the file to get corresponding digests. Digest is a fixed length of unique representation of an arbitrary length of data. With the calculated digest, it is compared with the digest of all the files in the client system. In case of a match, it could be concluded with a high probability that the two files are same with respect to a complete file, file content and meta-data based on the digest match.

Further, similar files may be different from the simple digest calculations. Here two files are compared for similar contents i.e. the content may not be exactly same but most of the characters may match. A similarity score may be given based on overlapping characters. The similarity score may depend on the underlying algorithms. Normally a range of the similarity score may extend from 0 to 100. Tools likes sdeep, sdHash may be used to compare two files and to provide the similarity score. Similarly, there Locality Sensitive Hashing, minHash, simHash algorithms may be used to derive the similarity score between two files.

In another embodiment, the file may be split into smaller snippets of consecutive data. These snippets may be hashed to get their corresponding digest. Such digests may be indexed along with the file details and the location of the snippet. These digests are searched in the index to get a list of the files containing that snippet. The above described process is performed in a fingerprinting component.

Figure 3A:
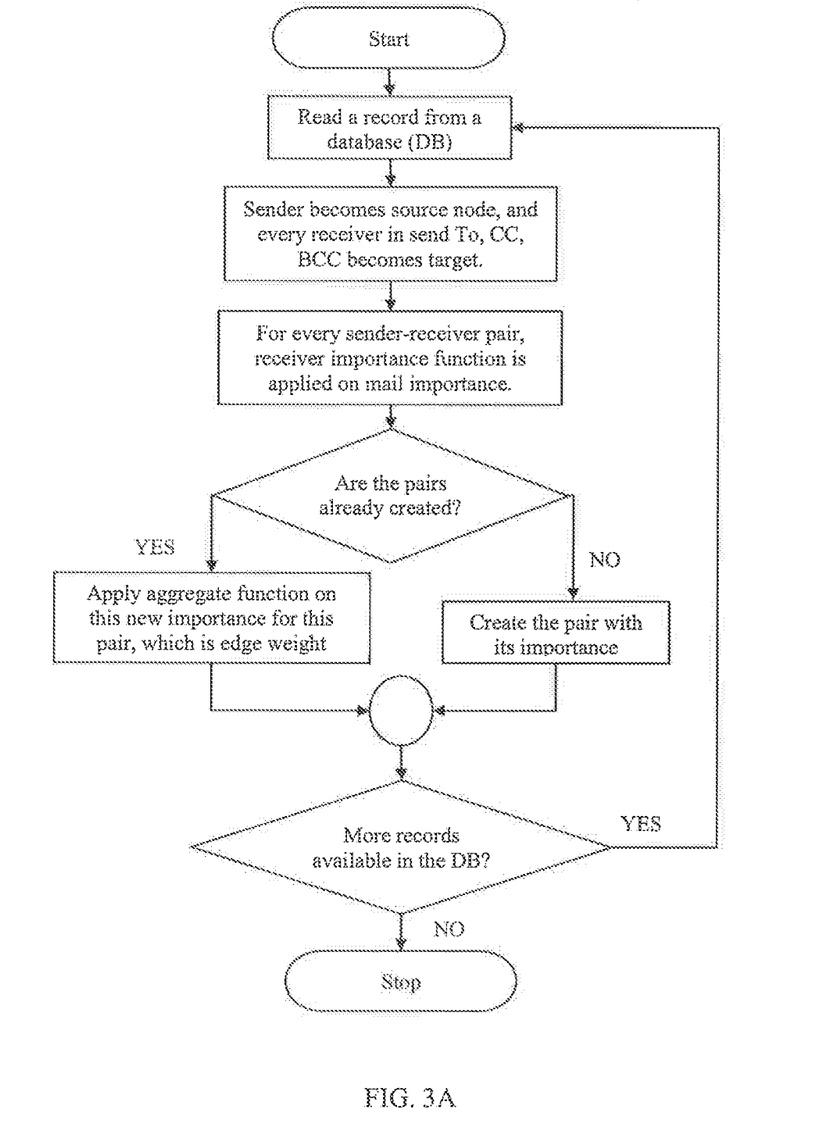
FIG. 3A and FIG. 3B illustrate flowcharts for social network discovery based on email communication and file sharing patterns respectively, in accordance with one embodiment of the present disclosure.
Figure 3B:
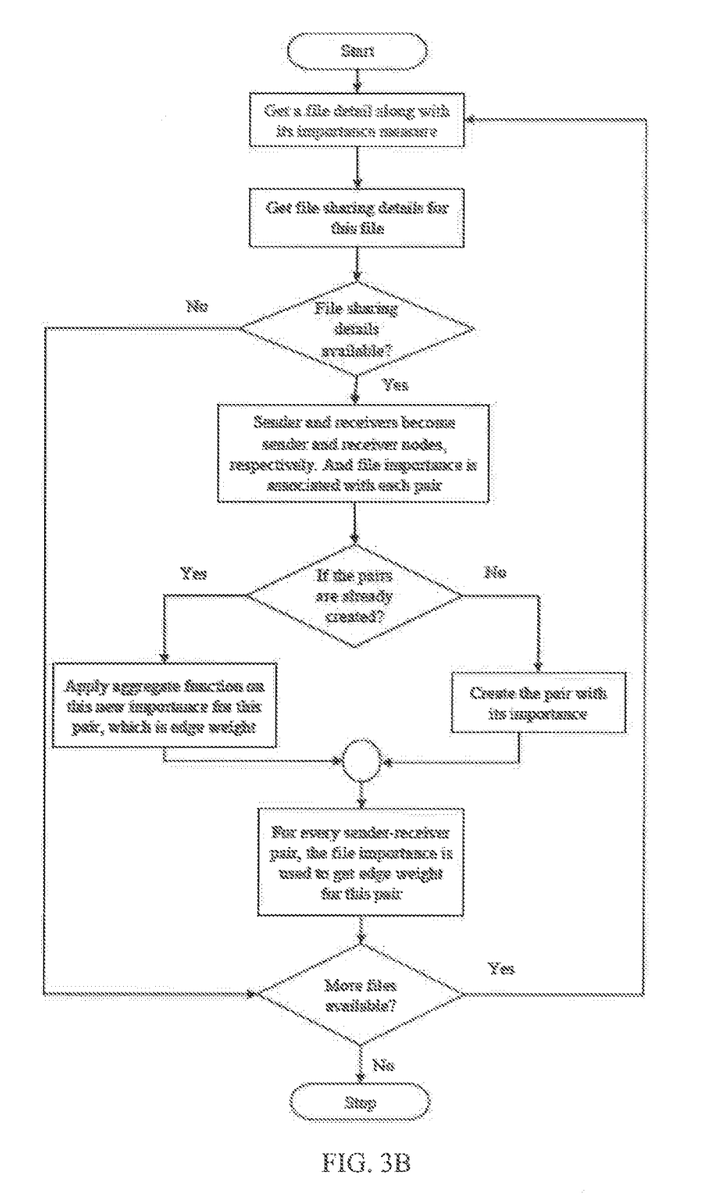

Referring now to FIGS. 3A and 3B that illustrate a method of discovering a social network based on email communication and file sharing patterns respectively on a broad level, in accordance with an embodiment of the present disclosure is explained. For ease of explanation, email communications from email clients such as IBM Lotus Notes™, Microsoft Outlook™, Mozilla Thunderbird™ are considered. Email communications, attachments, meeting invites, calendars, and chats are analyzed excluding the content. As generally illustrated in FIG. 3A, email files may be accessed and each document such as email, meeting invites, calendar events, etc. may be individually processed. For ease of explanation, mainly email communication and meeting invites are considered as official connections between people in an enterprise. Each user in the email communication as well as meeting invites will form a node and an edge between them. In an embodiment, sender is a source node and all receivers are target nodes. Source and target together form a pair. Based on certain parameters a score is calculated between them. After processing all the documents, the individual scores are normalized and a final score is calculated. Finally a graph is generated based on the nodes and an edge is created if the score exceeds certain threshold.

In one embodiment, the parameters used for defining the score may comprise m, c, a and t. The parameter m distinguishes direct and CC communications in an email. It may be assumed that, people marked in CC are to be informed about the communication occurring between From and Send To. Thus, more weight may be given to Send To than CC. Hence m=1 for Send To and m=0.5 for CC. The parameter c indicates importance of the email communication. The email communication in an enterprise may be classified as Restricted, Confidential, Internal, Private and Personal. Restricted email communication may be of very high importance and personal email communication may be of low importance with respect to official communication. Therefore c varies from 2 to 0.25, as mentioned below in an exemplary tabular form.

| 2.0 | Restricted |
| 1.5 | Confidential |
| 1.0 | Internal |
| 0.5 | Private |
| 0.25 | Personal |

Further, it may also be assumed that in most of the cases, a mail containing an attachment is considered to be more important. The parameter a increases the score based on the attachment. a=1 denotes attachment is present other wise 0, as indicated below in an exemplary tabular form.

| 1 | Attachment |
| 0 | No attachment |

Old documents don't comprise much information regarding present social network formed. People collaborating in past need not be still working together. Thus time stamp of the document is very important in determining the score of that document. The time parameter t varies from 1 to 0.25 as mentioned below in an exemplary tabular form.

| 1 | ≤3 months |
| 0.8 | ≤6 months |
| 0.75 | ≤9 months |
| 0.50 | ≤12 months |
| 0.25 | >12 months |

In one embodiment, in each email document, sender and receiver pairs may be created based on From, To and CC fields on the email and from meeting invites. Sender and receiver may be defined as nodes in the graph. An edge may be defined between them and a score may be calculated based on equations given below. Upon analysis of each of the documents i.e. mails, the score may be normalized and a final cumulative score may be defined as weight of the edge. The edges may be created when the score is beyond a threshold score. The scores may be computed using the below mentioned equations 1 and 2.

$$Score_{email} = (m*c + a)*t \qquad \text{Equation 1}$$

$$Score_{invite} = 2*t \qquad \text{Equation 2}$$

Likewise, as generally illustrated in FIG. 3B on a broad level, in an embodiment, for identifying file sharing patterns inputs such as location, metadata and at least one unique identifier for files associated with one or more file events from the client systems are analyzed and senders and receivers associated with each of the files are identified by extracting a timestamp associated with each of the files and identifying a file with the oldest time stamp in the one or more lists as a source file associated with a sender and the files other than the source file as the received files associated with one or more receivers. Thus, as explained with email communication, source-target or sender-receiver pairs can be formed.

Subsequent to creation of nodes and edges based on the threshold scores, graph can be drawn using available graph APIs such as Gephi, GraphStream API.

The social network graph formed contains nodes and edges as explained herein above. Each edge contains associated weights. In an embodiment, the weights are defined based on file sharing patterns as described above and temporal importance measure computed for email communication. In the context of the present disclosure, the temporal importance measure may also refer to importance measure computed by ignoring parameters pertaining to change in importance measure with respect to time by any technique known in the art. Based on the temporal importance measure of the communication, a receiver importance is estimated. In an embodiment, receiver importance may also be estimated based on the type of address in the communication such as TO, CC, BCC. A TO addressee maybe assigned a higher importance than CC addressee and accordingly a CC addressee may be assigned a higher importance than a BCC addressee. The edge weights are defined based on the estimated receiver importance and aggregate function is applied on the edge weights for each pair. The social network graph formed is a continuous process which gets updated either in real time, at pre-defined intervals or arbitrarily. In the social network graph, there can be set of nodes which has dense edge weights compared to other nodes outside this set. Such set of nodes forms a community in a social network graph. Techniques used to identify such communities are known as community detection algorithms. Overlying community detection algorithm identifies a set of nodes which can belong to more than one communities. In an embodiment of the present disclosure, the community detection technique may be used for either community detection or overlying community detection. In another embodiment, the community detection technique can be configured to receive pre-defined information pertaining to known communities among the users to enhance community detection.

Figure 4:
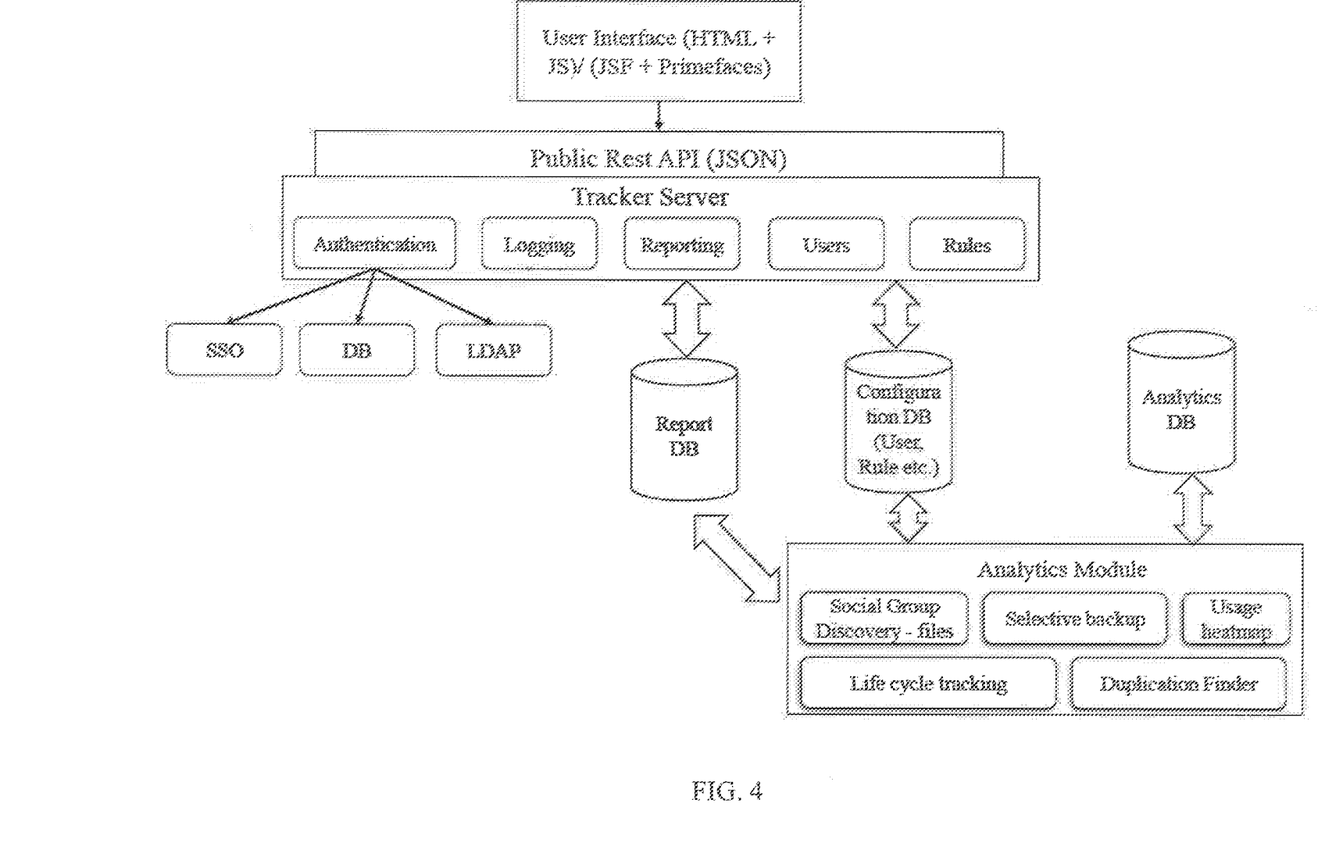
FIG. 4 illustrates a schematic representation of an exemplary data flow in an exemplary architecture of a file tracker server comprised in the system for optimized data backup in a distributed enterprise system, in accordance with an embodiment of the present disclosure.

In one embodiment, the file tracker may comprise a remote component, File tracker server, as illustrated in FIG. 4. The remote component may collate all of locally processed data and may perform a second level of distributed analysis. In an embodiment, the file tracker server system may comprise a repository of records of the attributes including metadata of files, the hash digests (metadata, content, complete file), location of the files, reference count of the files, communities associated with users of the files and level of granularity of duplication of the files (exact match, match to a degree, snippet match).

The file tracker server may provide a set of services for logging, uploading, reporting, and querying the file. A server based analytics engine, may perform further analytics on already processed data. Performing the analytics on the server may help in life cycle tracking of files, identifying social groups based on data sharing and may thus lead to development of an efficient backup plan.

In one embodiment, the file tracker server may provide a distributed analytic ability on the files residing in multiple client systems. The file tracker server may communicate with the client systems in periodic intervals and may get client side file information upon analysis. The file tracker server may get complete details regarding the files from all the clients and may perform a second level analytics on the file information available in the server. The client system may send the file details, analyzed information and user details to the file tracker server. For performing an analysis on the file, the file tracker server sends request to the client system and receives the analyzed information back. Therefore, the file tracker server utilizes the client system to perform actual content analysis and uses the information to perform the second level of analysis.

In yet another embodiment, the file tracker server may keep a track of all file details in the entire enterprise network. Therefore, the file tracker server may create a social network based on the file sharing patterns, which gives complete information about the connected employees in an enterprise based on file sharing pattern. While creating the network only the official sharing patterns are analyzed. As a new file is created in the client system, the client performs a detailed analysis on the new file and may send analyzed information to the server. With the help of analyzed information, the file tracker server may try to correlate with already available files. For an example, a file may be shared between two users. A receiver analyzes the file and sends detailed information of the file to the file tracker server. The file tracker server may try to correlate received information with other files. During such a condition, two cases may exist i.e. 1) both the user have same file at a given time, and 2) the file received by the user may not be available or may have been modified by the sender at the given time.

Further, the file tracker server may look-up to find current information about available files and find out that a file is already available in another client system. Thus, with user information the file tracker server connects the sender and receiver. Alternatively, the sender might have modified the file before it reached the other person, thus current information about that file in the sender machine will be different from the receiver's machine. Therefore, a normal lookup will not match since the sender may send the file to the receiver and the receiver may open/save the file before editing. These files are identical but having different timestamps. Therefore, the file tracker server needs to search for the previous file information so that the receiver's file has a match. Thus, again the file tracker server can correlate the users. Therefore the system can capture the file sharing patterns with a high probability.

In one embodiment, a duplication finder may help in identifying all the duplicate files in an entire distributed network. The duplication finder may have an access to the monitoring file details residing in all client systems. Using the client's duplication API, all unique file details in the client system are sent to the file tracker server. During such an event, there can be following two scenarios i.e. 1) information pertaining to unique file from the client is not present in the server or 2) information pertaining to unique file from the client is present in the server. It may be easy to handle the first case. Since the file from the client may not be present in the server, the file details may be stored in the server database. In the second case, the unique file from the client may be already present in the server. It may be required to store the client details and the file location in the client system for further analysis. Thus, the file tracker server contains only the unique files on the entire network and also the details regarding the list of clients on which those file resides. For similar files across distributed network, it is time consuming to check every file with every other file in the complete system. Duplication Finder utilizes the client duplication API to get the list of similar files for the given file. The subset of files will be very much lesser than comparing with all possible combinations. Thus for the given file, Duplication Finder queries all the clients for similar files. Here the client system resource is used to find the similar files, thus reducing the resource constrain on the server.

In another embodiment, a social network discovery may be performed in a distributed manner. In an IT enterprise, people collaborate with each other to carry out required tasks. They start working together by sharing files among them. In most of the cases, at some point of time the sender and the receiver will have exact copy of the file. When the file is received by the user, the notification agent and the analytics engine in the client system collects the information about the file. This collected information is sent to the server. The server may already contain the information about that file, so it correlates the received information with the already existing information. The system may link the two users having same file content and forms a link between them.

In an embodiment, with the help of deduplication and social network discovered, an optimized method that efficiently enables backup from a group of collaborating user's machine is provided. The server may have the information regarding all the file details including the reference count and all locations of the duplicate file in the entire network. The discovered social network may provide information about the group of users who collaborate together to carry out the business related tasks. It may be assumed that, there are high chances that there are many exact as well as similar files reside in their machines. The social network gives the list of people working together and the deduplication among these users will give the list of unique files which may be stored as a backup. Deduplication based on the social network enables an efficient method to take backup of machines in an order such that backup of selective files from each machine covers all files from all machines. In an embodiment, a backup technique, as mentioned below, may be used,

---

Algorithm 1: BackUp($\mathcal{M}$, $\mathcal{F}$)

Input: $\mathcal{M} \leftarrow \{M_1, \ldots, M_k\}$, $\mathcal{F} \leftarrow \{f_1, \ldots, f_t\}$, where $\mathcal{F}$ is a unique set of files in $\mathcal{M}$.
Ouptput: $MF_b$
1  Initialize: $MF_b = \emptyset$
2  while $\mathcal{F} \not\subseteq \emptyset$ do
3  |   $F_r \leftarrow FileRef_{min}(\mathcal{F})$
4  |   $M_r \leftarrow Machine_{bkp}(F_r)$
5  |   $\mathcal{F}_b \leftarrow File_{bkp}(\mathcal{F}, M_r)$
6  |   $MF_b \leftarrow MF_b \cup \{M_r, \mathcal{F}_b\}, \mathcal{M} \leftarrow \mathcal{M} \setminus M_r$
7  |_  $\mathcal{F} \leftarrow \mathcal{F} \setminus \mathcal{F}_b$
8  return $MF_b$

---

The backup algorithm may take the set of user machines working together based on the social network discovery and the set of unique files amongst selected machines. The set may be an ordered set, ordered by a reference count in one exemplary instance. A backup set $MF_b$, contains machine details and set of files in that machine to take backup, in the order the backup set is filled in. The backup set is first initialized to empty. The function $FileRef_{min}()$ orders the files and gives a set of files with minimum reference count. The set can have one or more files with same reference count. $Machine_{bkp}()$ function takes this set of files and outputs a single machine which may cover a maximum number of files in set given by $FileRef_{min}()$. A file can reside in more than one machine and this function gets all the machines in which that particular file resides. Along with the machine, $FileRef_{min}()$ also calculates how many files from that set resides in each machine. Finally $FileRef_{min}()$ outputs a machine, $M_r$, with maximum files. For example, consider $M=\{M_1, M_2\}$ and $F_r=\{f_1, f_2, f_3, f_4\}$ are files with reference count 1 such that $f_1$ resides in $M_1$, $f_2$ in $M_1$, $f_3$ in $M_2$ and $f_4$ in $M_1$. Since three files resides in $M_1$, $Machine_{bkp}()$ function outputs $M_1$.

Further, $File_{bkp}()$ function gives the set of all files which are marked for backup from the given set of files residing in the given machine. This set of files and the machine information forms a tuple and it is added to backup set $MF_b$. Once all the files are marked for backup, the method returns the backup set $MF_b$ which contains the order in which the machines and what files from that machine needs to be taken backup.

By way of explanation, an exemplary scenario explaining the backup methodology adopted by the present disclosure is provided herein with reference to client system A, client system B and client system C having 20 files each. Assuming, client system A has 15 files with reference count 1 and 5 files with reference count 2 wherein these 5 files are common between client system A and client system B. Further, client system B has 10 files with reference count 1 and 10 files with reference count 2 wherein 5 files are common between client system B and client system A and the remaining 5 files are common between client system B and client system C. Furthermore, client system C has 5 files with reference count 1 and 5 files with reference count 2 wherein the files are common with client system A and 10 files with reference count 2 wherein the files are common with client system B. In accordance with the present disclosure, client system A will be the first identified client system to be backed up since it has maximum number of files with reference count 1 (minimum reference count). Once the 20 files from the client system A are backed up, client system B will be identified for backup and subsequently client system C having the maximum number of files with reference count 2 will be backed up.

Figure 6A:
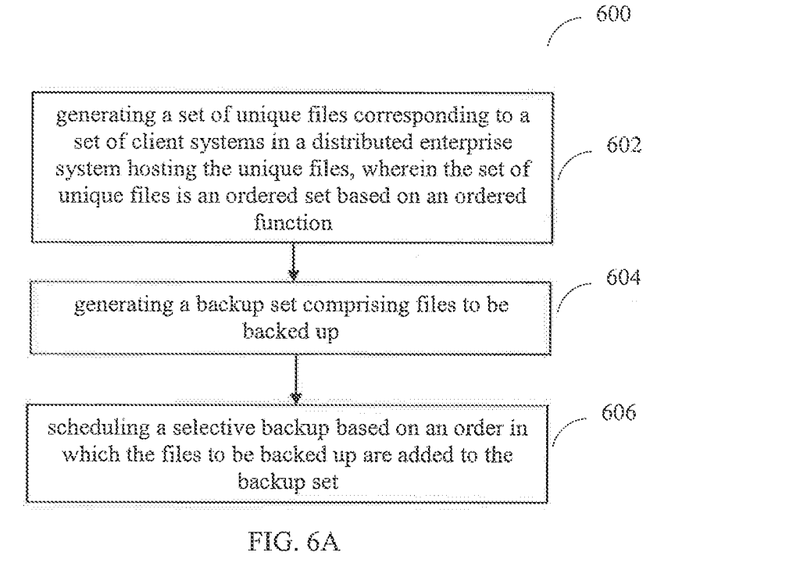
FIG. 6A through 6C illustrate an exemplary flow chart of a method for optimized data backup in a distributed enterprise system, in accordance with an embodiment of the present disclosure.
Figure 6B:
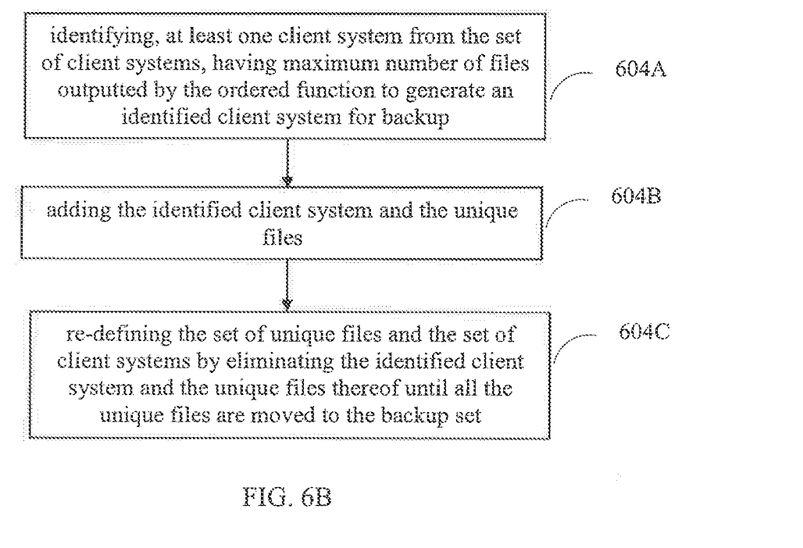
Figure 6C:
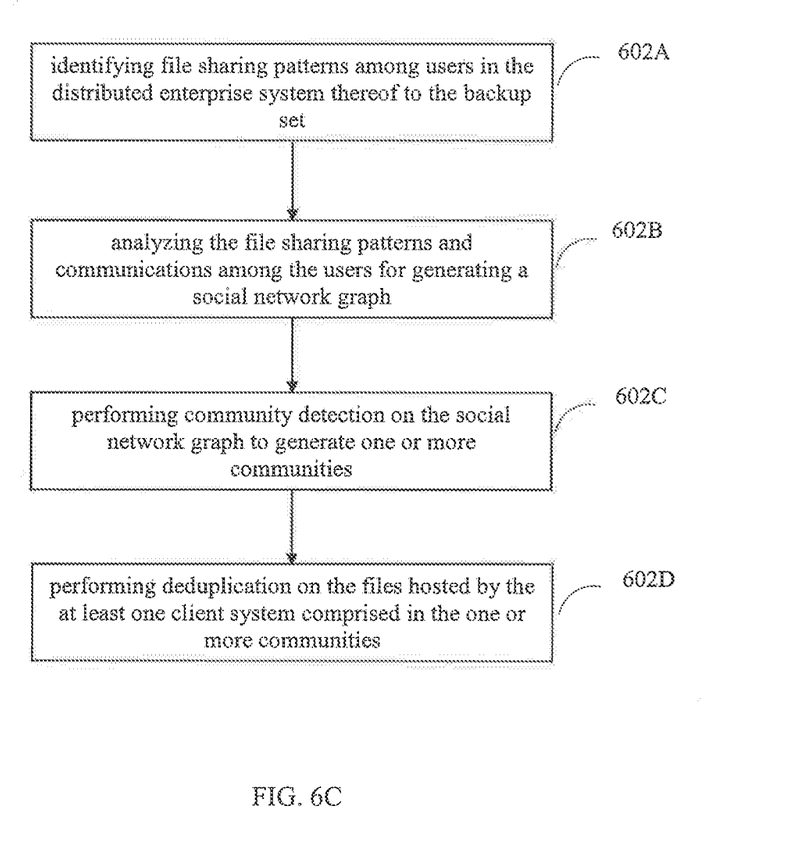

Referring now to FIG. 6A through 6C, a processor implemented method 600 for optimizing data backup in a distributed enterprise system is shown, in accordance with an embodiment of the present disclosure. The method 600 may be described in the general context of processor executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described and is not intended to be construed as a limitation, and any number of the described method blocks can be combined in any order to implement the method 600 or alternate methods. Additionally, individual blocks may be deleted from the method 600 without departing from the spirit and scope of the disclosure described herein. Furthermore, the method can be implemented in any suitable hardware, software, firmware, or combination thereof. In an embodiment, the method 600 described herein below may be implemented in the above-described system 602.

At step 602, a set of unique files corresponding to a set of client systems in a distributed enterprise system hosting the unique files are generated. In an embodiment, the set of unique files is an ordered set based on an ordered function. For instance, the ordered set can be based on the reference count associated with the files.

At step 604, a backup set comprising files to be backed up is generated. In an embodiment the backup set is generated by iteratively performing steps 604A through 604C respectively, wherein at step 604A, at least one client system having maximum number of files outputted by the ordered function is identified for backup. At step 604B, the identified client system and the unique files hosted by the identified client system are added to the backup set. At step 604C, the set of unique files and the set of client systems are re-defined by eliminating the identified client system and the unique files hosted by the identified client system until all the unique files are moved to the backup set.

In an embodiment, the set of unique files are generated at step 602 by firstly identifying the sharing patterns among users in the distributed enterprise system at step 602A. The file sharing patterns and communications among the users are then analyzed for generating a social network graph at step 602B. One or more communities are then generated based on the social network graph at step 602C and deduplication is performed on the files hosted by the at least one client system comprised in the one or more generated communities at step 602D. In an embodiment, deduplication may be performed at two levels. A first level deduplication may be performed at the one or more client systems based on the content, the metadata and the at least one unique identifier associated with the files; and a second level deduplication may be performed on the files from each of the one or more client systems in the distributed enterprise system based on the metadata and the at least one unique identifier associated with the files. Thus the present disclosure efficiently ensures deduplication at the enterprise level.

Figure 5A:
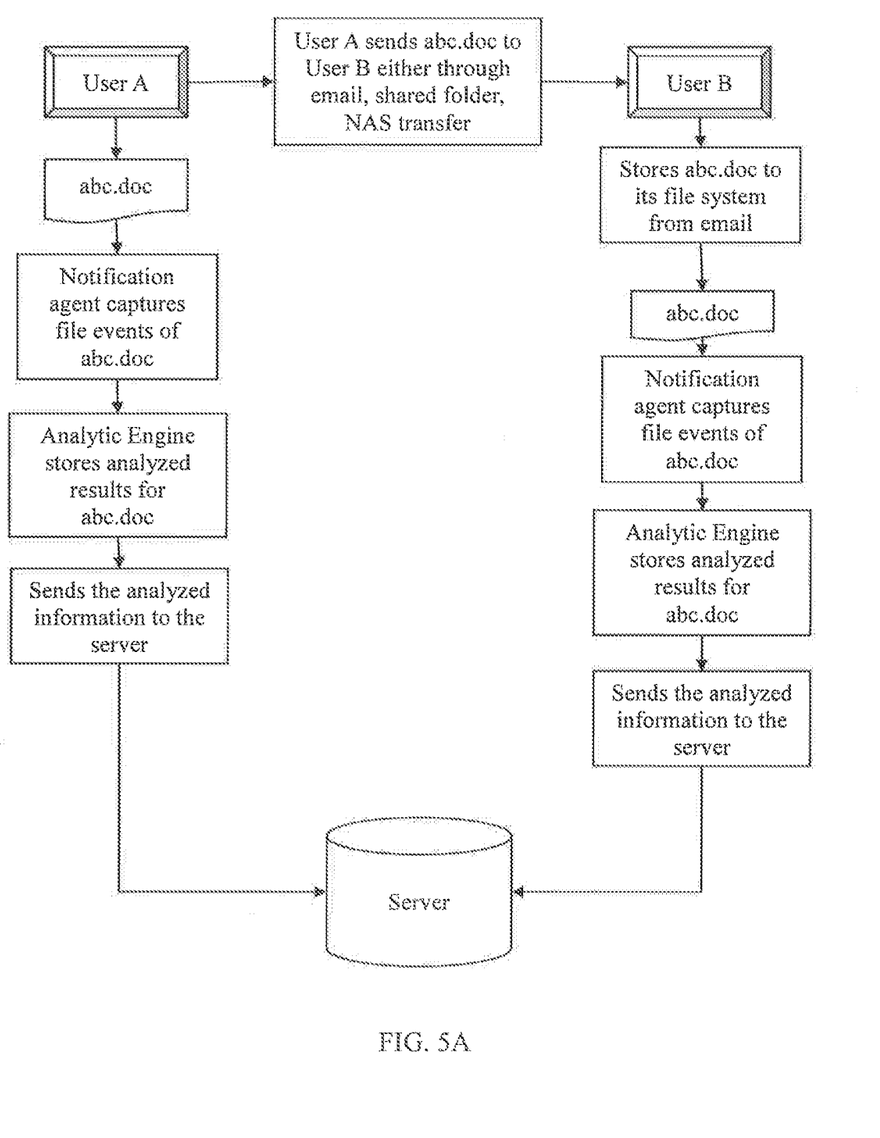
FIGS. 5A and 5B illustrate exemplary flow charts of a method of identifying file sharing patterns in accordance with an embodiment of the present disclosure.
Figure 5B:
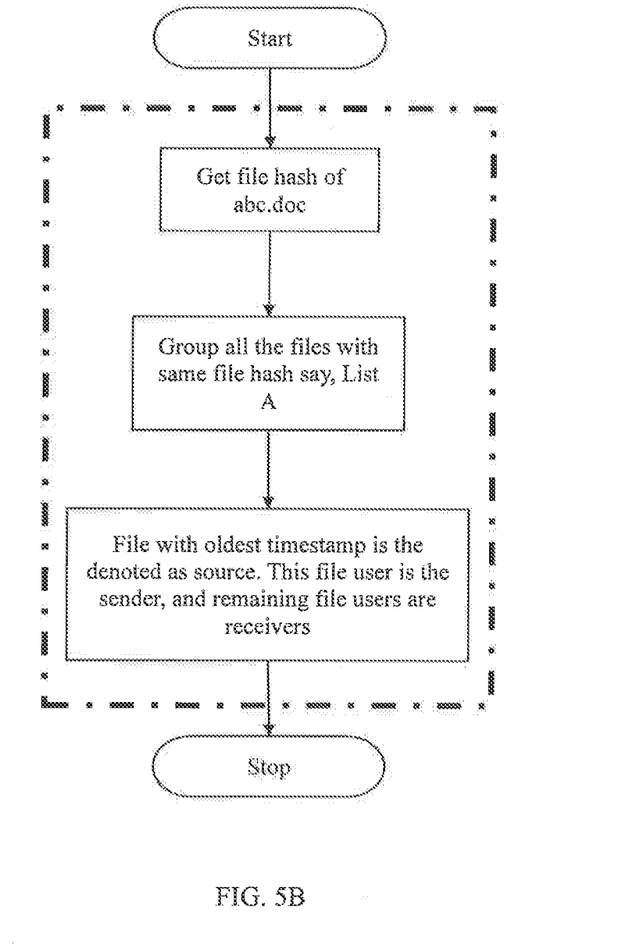

In an embodiment, step 602A wherein file sharing patterns are identified further comprises receiving inputs including location, metadata and at least one unique identifier for files associated with one or more file events from the client systems. The unique identifier for files may be a hash digest for each of the files, the content or the metadata based on a hash technique. The inputs are then analyzed and the files having matching content are characterized based on a level of granularity of duplication therein. In an embodiment, the level of granularity of duplication is one of (i) having an exact match of all of the at least one unique identifier; (ii) having a pre-defined level of match of the content; and (iii) having a match of at least one snippet in the files by fingerprinting of the content. Subsequently, senders and receivers associated with each of the files are identified based on the characterization of the files. In an embodiment, the senders and receivers may be identified by extracting a timestamp associated with each of the files and identifying a file with the oldest time stamp in the one or more lists as a source file associated with a sender and the files other than the source file as the received files associated with one or more receivers. An exemplary illustration of identifying file sharing patterns in accordance with an embodiment of the present disclosure is as depicted in FIGS. 5A and 5B.

In an embodiment, step 602B wherein a social network is generated further comprises generating a social network graph having nodes corresponding to the senders and receivers and edges characterized by weights assigned based on temporal importance measure computed for the communications between the users and the file sharing patterns; and computing a score for each sender-receiver pair based on type of recipient, classification of communication between the senders and receivers and presence of attachments.

The written description describes the subject matter herein to enable any person skilled in the art to make and use the embodiments of the instant disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, systems and methods of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as either software and/or hardware modules and may be stored in any type of non-transitory computer readable medium or other storage device. Some non-limiting examples of non-transitory computer-readable media include CDs, DVDs, BLU-RAY, flash memory, and hard disk drives.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items, it must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

We claim:

1. A method comprising:
   generating a set of unique files corresponding to a set of client systems in a distributed enterprise system hosting the unique files, wherein the set of unique files is an ordered set based on an ordered function, wherein generating the set of unique files further comprises:
      identifying file sharing patterns among users in the distributed enterprise system;
      analyzing the file sharing patterns and communications among the users for generating a social network graph;
      performing community detection on the social network graph to generate one or more communities; and
      performing deduplication on the files hosted by the at least one client system comprised in the one or more communities;
   generating a backup set comprising files to be backed up by iteratively performing:
      identifying, at least one client system from the set of client systems, having maximum number of files outputted by the ordered function to generate an identified client system for backup;
      adding the identified client system and the unique files thereof to the backup set; and
      re-defining the set of unique files and the set of client systems by eliminating the identified client system and the unique files thereof until all the unique files are moved to the backup set; and
   scheduling a selective backup based on an order in which the files to be backed up are added to the backup set.

2. The method of claim 1, wherein the ordered function is based on a reference count.

3. The method of claim 1, wherein identifying file sharing patterns comprises:
   receiving inputs comprising location, metadata and at least one unique identifier for files associated with one or more file events from the client systems;
   analyzing the inputs and characterizing the files having matching content therein based on a level of granularity of duplication therein, the level of granularity of duplication being one of (i) having an exact match of all of the at least one unique identifier; (ii) having a pre-defined level of match of the content; and (iii) having a match of at least one snippet in the files by finger-printing of the content; and
   identifying senders and receivers associated with each of the files based on the characterization of the files.

4. The method of claim 3, wherein the at least one unique identifier comprises a hash digest for each of the files, the content and the metadata based on a hash technique.

5. The method of claim 3, wherein identifying senders and receivers comprises:
   extracting a timestamp associated with each of the files and identifying a file with the oldest time stamp in the one or more lists as a source file associated with a sender and the files other than the source file as the received files associated with one or more receivers.

6. The method of claim 3, wherein generating a social network graph comprises:
   generating a social network graph having nodes corresponding to the senders and receivers and edges characterized by weights assigned based on temporal importance measure computed for the communications between the users and the file sharing patterns; and
   computing a score for each sender-receiver pair based on type of recipient, classification of communication between the senders and receivers and presence of attachments.

7. The method of claim 1, wherein performing community detection comprises use of a community detection technique configured to receive pre-defined information pertaining to known communities among the users.

8. The method of claim 1, wherein performing deduplication comprises:
   a first level deduplication, at the one or more client systems, the first level deduplication being based on the content, the metadata and the at least one unique identifier associated with the files; and
   a second level deduplication of the files from each of the one or more client systems in the distributed enterprise system, the second level deduplication being based on the metadata and the at least one unique identifier associated with the files.

9. A system comprising:
   one or more processors; and
   one or more data storage devices operatively coupled to the one or more processors and configured to store instructions configured for execution by the one or more processors to:
   generate a set of unique files corresponding to a set of client systems in a distributed enterprise system hosting the unique files, wherein the set of unique files is an ordered set based on an ordered function, wherein the said one or more processors are further configured to generate the set of unique files by:
      identifying file sharing patterns among users in the distributed enterprise system;
      analyzing the file sharing patterns and communications among the users for generating a social network graph;
      performing community detection on the social network graph to generate one or more communities; and
      performing deduplication on the files hosted by the at least one client system comprised in the one or more communities;
   generate a backup set comprising files to be backed up by iteratively performing:
      identifying, at least one client system from the set of client systems, having maximum number of files outputted by the ordered function to generate an identified client system for backup;
      adding the identified client system and the unique files thereof to the backup set; and re-defining the set of unique files and the set of client systems by eliminating the identified client system and the unique files thereof until all the unique files are moved to the backup set; and schedule a selective backup based on an order in which the files to be backed up are added to the backup set.

10. The system of claim 9, wherein the ordered function is based on a reference count.

11. The system of claim 9, wherein the one or more processors are further configured to identify file sharing patterns by:

receiving inputs comprising location, metadata and at least one unique identifier for files associated with one or more file events from the client systems;

analyzing the inputs and characterizing the files having matching content therein based on a level of granularity of duplication therein; and identifying senders and receivers associated with each of the files based on the characterization of the files.

12. The system of claim 11, wherein the at least one unique identifier comprises a hash digest for each of the files, the content and the metadata based on a hash technique.

13. The system of claim 11, wherein the one or more processors are further configured to identify senders and receivers by extracting a timestamp associated with each of the files and identifying a file with the oldest time stamp in the one or more lists as a source file associated with a sender and the files other than the source file as the received files associated with one or more receivers.

14. The system of claim 11, wherein the level of granularity of duplication is one of (i) having an exact match of all of the at least one unique identifier; (ii) having a pre-defined level of match of the content; and (iii) having a match of at least one snippet in the files by fingerprinting of the content.

15. The system of claim 11, wherein the one or more processors are further configured to generate a social network graph by:

generating a social network graph having nodes corresponding to the senders and receivers and edges characterized by weights assigned based on temporal importance measure computed for the communications between the users and the file sharing patterns; and computing a score for each sender-receiver pair based on type of recipient, classification of communication between the senders and receivers and presence of attachments.

16. The system of claim 9, wherein the one or more processors are further configured to perform community detection based on a community detection technique configured to receive pre-defined information pertaining to known communities among the users.

17. The system of claim 9, wherein the one or more processors are further configured to perform deduplication comprising:

a first level deduplication, at the one or more client systems, the first level deduplication being based on the content, the metadata and the at least one unique identifier associated with the files; and a second level deduplication of the files from each of the one or more client systems in the distributed enterprise system, the second level deduplication being based on the metadata and the at least one unique identifier associated with the files.

18. A computer program product comprising a non-transitory computer readable medium having a computer readable program embodied therein, wherein the computer readable program, when executed on a computing device, causes the computing device to:

generate a set of unique files corresponding to a set of client systems in a distributed enterprise system hosting the unique files, wherein the set of unique files is an ordered set based on an ordered function, wherein the said product is further configured to generate the set of unique files by:

identifying file sharing patterns among users in the distributed enterprise system;

analyzing the file sharing patterns and communications among the users for generating a social network graph;

performing community detection on the social network graph to generate one or more communities; and performing deduplication on the files hosted by the at least one client system comprised in the one or more communities;

generate a backup set comprising files to be backed up by iteratively performing:

identifying, at least one client system from the set of client systems, having maximum number of files outputted by the ordered function to generate an identified client system for backup;

adding the identified client system and the unique files thereof to the backup set; and re-defining the set of unique files and the set of client systems by eliminating the identified client system and the unique files thereof until all the unique files are moved to the backup set; and schedule a selective backup based on an order in which the files to be backed up are added to the backup set.

* * * * *